United States Patent
Maeda et al.

(10) Patent No.: US 12,388,965 B2
(45) Date of Patent: Aug. 12, 2025

(54) IMAGE PROCESSING SYSTEM, IMAGE PROCESSING METHOD, AND STORAGE MEDIUM

(71) Applicant: CANON KABUSHIKI KAISHA, Tokyo (JP)

(72) Inventors: Mitsuru Maeda, Tokyo (JP); Mamoru Tanae, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 228 days.

(21) Appl. No.: 18/174,685

(22) Filed: Feb. 27, 2023

(65) Prior Publication Data
US 2023/0291883 A1 Sep. 14, 2023

(30) Foreign Application Priority Data
Mar. 10, 2022 (JP) .................................. 2022-037555

(51) Int. Cl.
G06T 3/20 (2006.01)
G06T 7/70 (2017.01)
H04N 13/117 (2018.01)
H04N 13/378 (2018.01)

(52) U.S. Cl.
CPC ............. H04N 13/117 (2018.05); G06T 7/70 (2017.01); H04N 13/378 (2018.05); *G06T 2207/30201* (2013.01)

(58) Field of Classification Search
CPC .. H04N 13/117; H04N 13/378; H04N 13/243; H04N 13/111; G06T 7/70; G06T 2207/30201; G06T 15/20
See application file for complete search history.

(56) References Cited

U.S. PATENT DOCUMENTS

| 11,076,140 | B2 | 7/2021 | Maeda | |
| 11,893,705 | B2* | 2/2024 | Karasawa | G06T 7/90 |
| 2013/0257857 | A1* | 10/2013 | Kakizawa | H04N 13/275 |
| | | | | 345/419 |
| 2015/0093044 | A1* | 4/2015 | Feder | G06F 16/5854 |
| | | | | 382/284 |

(Continued)

FOREIGN PATENT DOCUMENTS

JP 2015-045920 A 3/2013
JP 2017-501500 A 1/2017

(Continued)

OTHER PUBLICATIONS

Notice of Reasons for Refusal issued by the Japanese Patent Office on Jan. 9, 2024 in corresponding JP Patent Application No. 2022-037555, with English translation.

(Continued)

*Primary Examiner* — Howard D Brown, Jr.
(74) *Attorney, Agent, or Firm* — Carter, DeLuca & Farrell LLP

(57) ABSTRACT

In order to provide an image processing system that can generate appealing content, an image capturing system 100 generates stereoscopic form digital contents 200 including a first image that is a main camera image, and a second image that is a virtual viewpoint image, and associates the first image and the second image with a first plane 201 and a second plane 202 that configure the digital contents 200.

17 Claims, 8 Drawing Sheets

(56) References Cited

U.S. PATENT DOCUMENTS

| | | | |
|---|---|---|---|
| 2016/0307372 A1* | 10/2016 | Pitts | H04N 23/957 |
| 2017/0244948 A1* | 8/2017 | Pang | H04N 23/957 |
| 2018/0020204 A1* | 1/2018 | Pang | H04N 23/90 |
| 2018/0035134 A1* | 2/2018 | Pang | H04N 13/117 |
| 2018/0089903 A1* | 3/2018 | Pang | H04N 23/45 |
| 2018/0204381 A1* | 7/2018 | Kanatsu | G06T 7/248 |
| 2018/0332317 A1* | 11/2018 | Song | H04N 13/344 |
| 2019/0251682 A1* | 8/2019 | Feder | H04N 1/3871 |
| 2021/0134058 A1 | 5/2021 | Ito et al. | |
| 2021/0160473 A1* | 5/2021 | Uemura | H04N 13/167 |
| 2021/0203905 A1 | 7/2021 | Maeda | |
| 2021/0266511 A1 | 8/2021 | Ogasawara | |
| 2022/0414962 A1* | 12/2022 | Shirai | G06V 20/20 |

FOREIGN PATENT DOCUMENTS

| | | |
|---|---|---|
| JP | 2019-520618 A | 7/2019 |
| JP | 2021-086189 A | 6/2021 |
| JP | 2022-032491 A | 2/2022 |
| WO | 2018/199052 A1 | 11/2018 |
| WO | 2021/246498 A1 | 12/2021 |

OTHER PUBLICATIONS

Extended European Search Report issued in EP Patent Application No. 23159343.5, dated Jun. 30, 2023, pp. 1-8.

Decision of Refusal issued by the Japanese Patent Office on Jun. 4, 2024 in corresponding JP Patent Application No. 2022-037555, with English translation.

Office Action issued by the European Patent Office on May 26, 2025 in corresponding EP Patent Application No. 23159343.5.

McCutchen, D. et al., "3DAV Exploration of Video-Based Rendering Technology in Mpeg" IEEE Transactions on Circuits and Systems for Video Technology (Mar. 2004) pp. 348-356, vol. 14, No. 3, XP011108800.

* cited by examiner

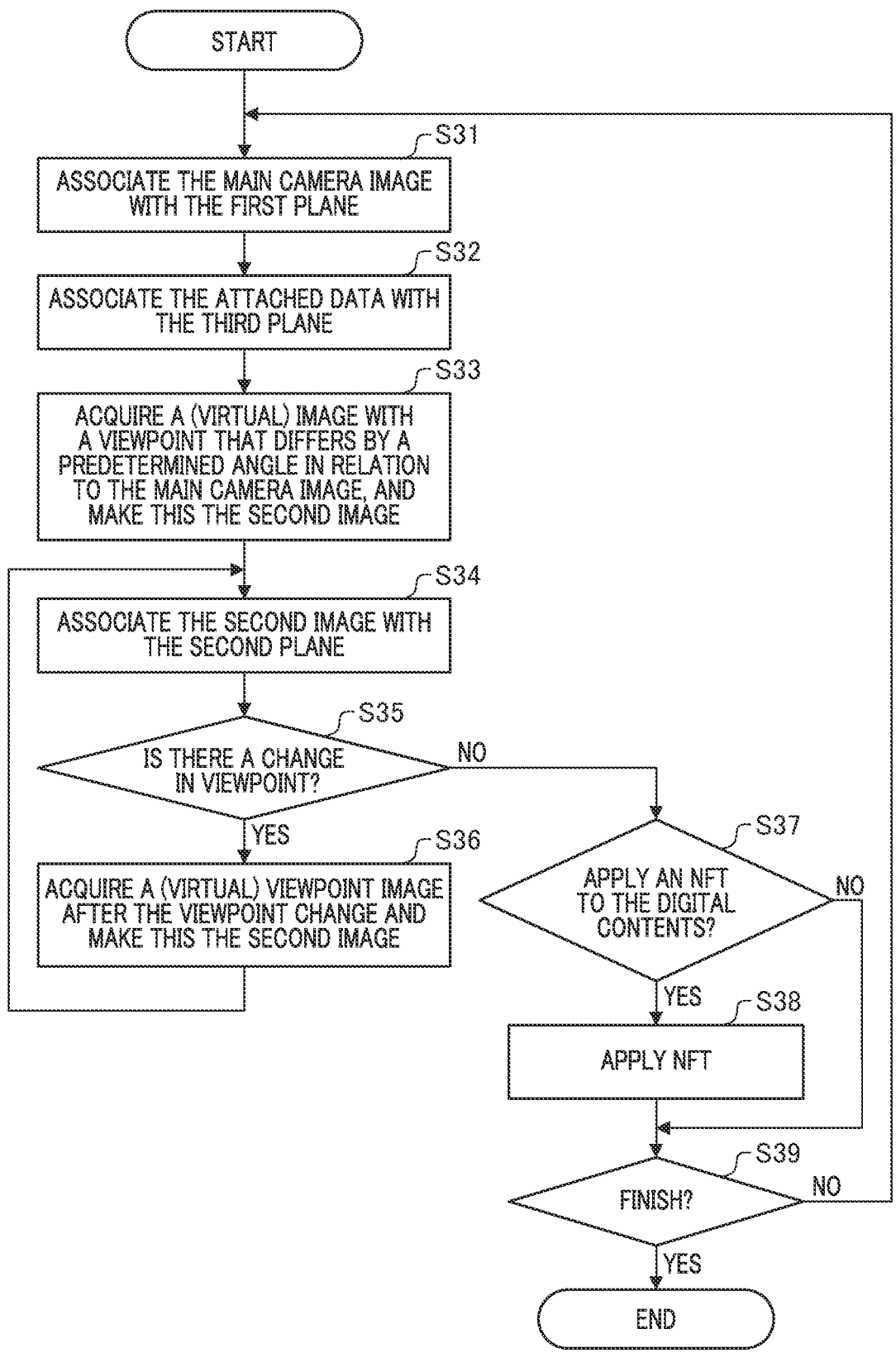

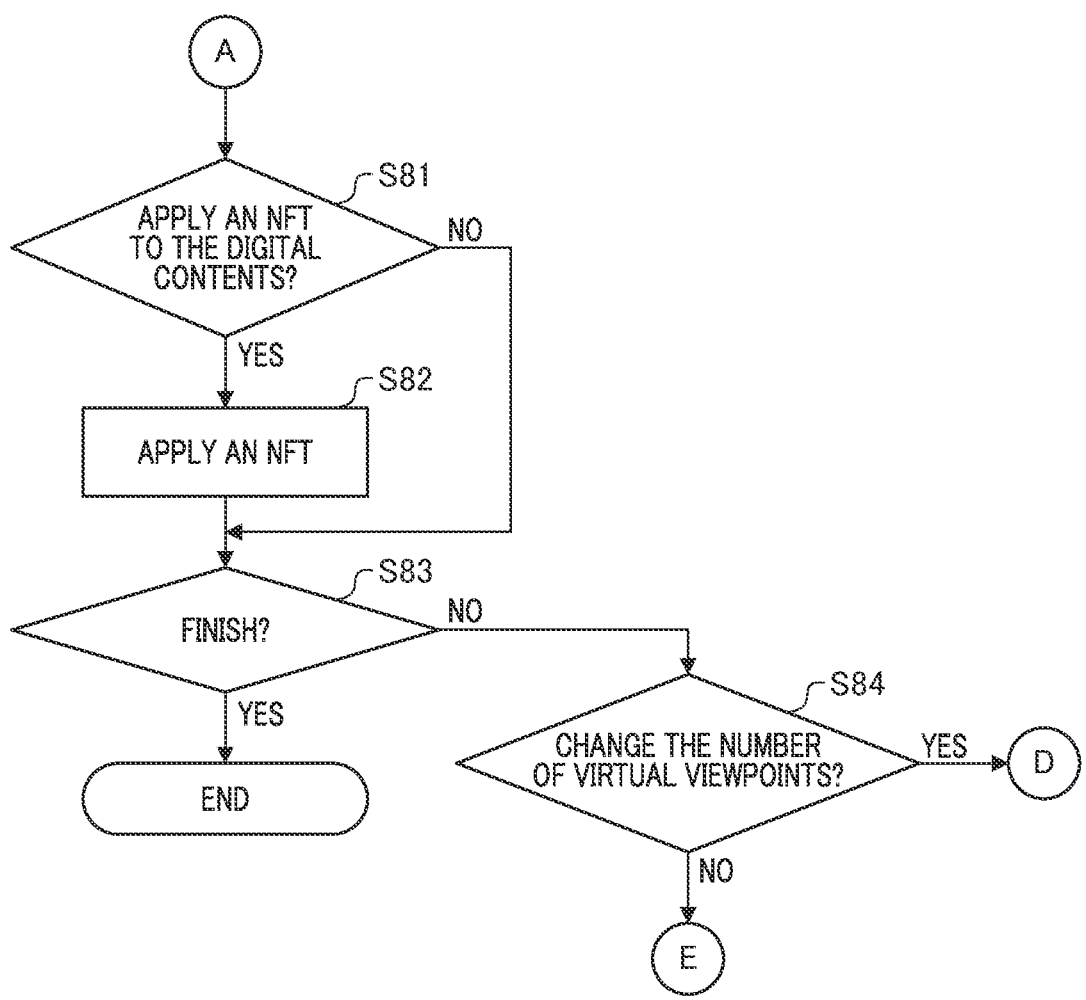

IMAGE PROCESSING SYSTEM, IMAGE PROCESSING METHOD, AND STORAGE MEDIUM

BACKGROUND OF THE INVENTION

Field of the Invention

The present disclosure relates to an image processing system, an image processing method, a storage medium, and the like.

Description of Related Art

Technology that uses a plurality of images obtained from the image capturing of a plurality of image capturing devices and generates a virtual viewpoint image from a selected virtual viewpoint is gaining attention. Japanese Unexamined Patent Application, First Publication No. 2015-45920 discloses a method in which images are captured of a subject by installing a plurality of image capturing devices in different positions, and a three-dimensional form of the subject that is estimated based on the captured images that have been obtained by image capturing is used to generate a virtual viewpoint image.

However, this method was not able to provide attractive digital contents that include virtual viewpoint images and other images.

SUMMARY OF THE INVENTION

An image processing system according to one embodiment of the present invention has at least one processor or circuit configured to function as: an acquisition unit configured to acquire a virtual viewpoint image generated based on a plurality of images and a virtual viewpoint obtained by image capturing by a plurality of image capturing devices; and
 a generating unit configured to generate stereoscopic form digital contents including the virtual viewpoint image that has been acquired by the acquisition unit, and an image from a viewpoint that differs from the virtual viewpoint corresponding to the virtual viewpoint image;
 wherein the generating unit associates the virtual viewpoint image, and the image from a viewpoint that differs from the virtual viewpoint corresponding to the virtual viewpoint image with different planes that configure the digital contents.

Further features of the present disclosure will become apparent from the following description of embodiments with reference to the attached drawings.

BRIEF DESCRIPTION OF THE DRAWINGS

FIG. 3 is a flow chart for explaining the operational flow of the image processing system 100 in the First Embodiment.

FIG. 8 is a continuation of the flowchart in FIG. 7.

DETAILED DESCRIPTION OF THE INVENTION

Figure 1:
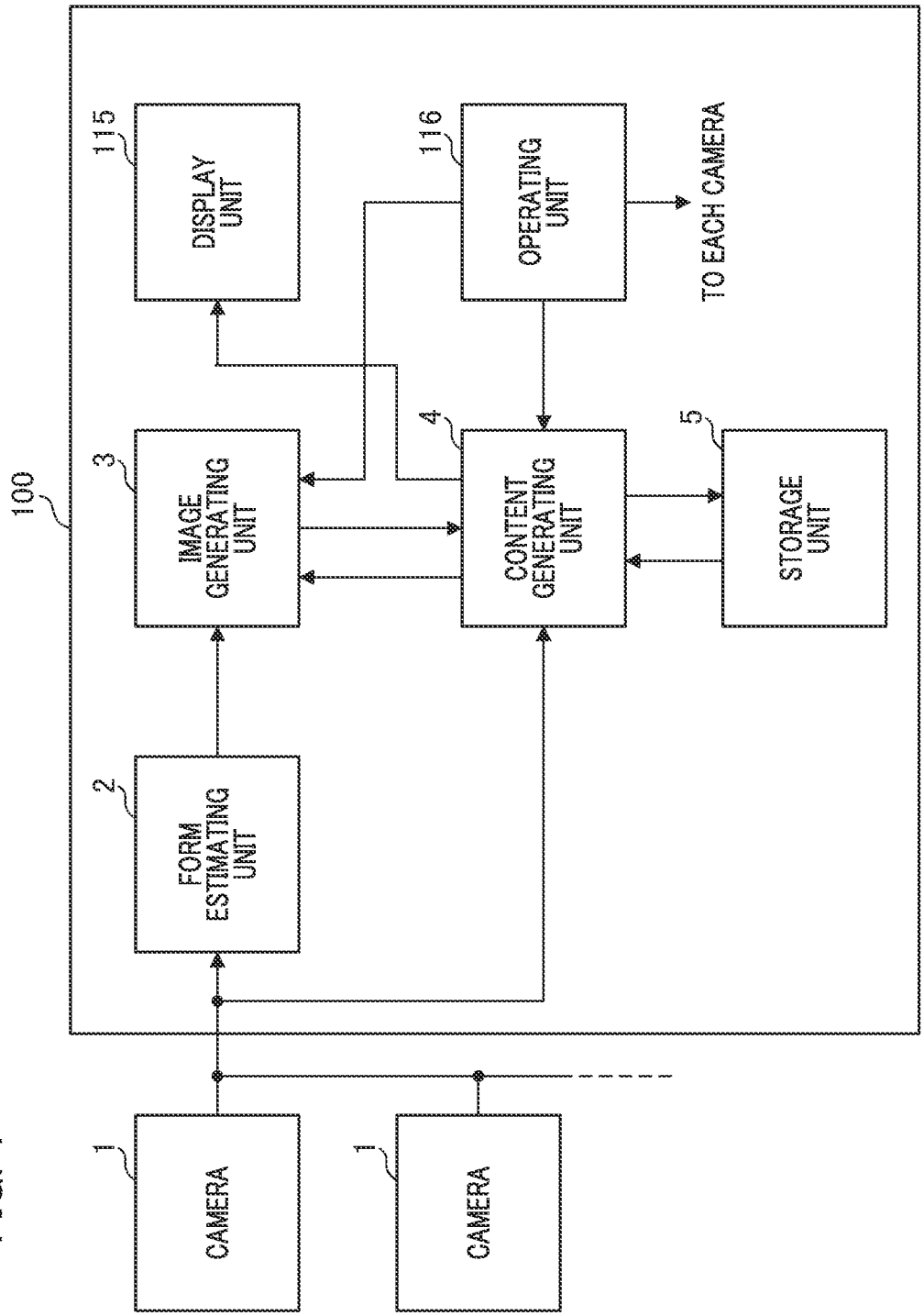
FIG. 1 is a diagram showing one example of a device configuration for an image processing system 100 according to a First Embodiment.

Hereinafter, with reference to the accompanying drawings, favorable modes of the present disclosure will be described using Embodiments. In each diagram, the same reference signs are applied to the same members or elements, and duplicate descriptions will be omitted or simplified.

First Embodiment

The image processing system according to the First Embodiment generates a virtual viewpoint image as seen from a virtual viewpoint based on captured images that are acquired by image capturing using a plurality of image capturing devices (cameras) from different directions, the state of an image capturing device, and a designated virtual viewpoint.

In addition, this virtual viewpoint image is displayed on the surface of a virtual stereoscopic image. Note that the image capturing devices may also have a functional unit that performs image processing instead of just a camera. In addition, the image capturing devices may also have a sensor that acquires distance information other than a camera.

The plurality of cameras captures images of an image capturing region from a plurality of directions. The image capturing region is, for example, a region that surrounds the field of a sports stadium at an arbitrary height. The image capturing region may also be made to correspond to a three-dimensional space that estimates the three-dimensional form of the above-described subject. The three-dimensional space may be the entirety of the image capturing region, or it may also be a portion thereof. In addition, the image capturing region may also be a concert venue, a photography studio, or the like.

Each of the plurality of cameras in the plurality of cameras is installed in a different position and a different direction (posture) to as to surround the image capturing region, and perform synchronized image capturing. Note that the plurality of cameras does not need to be installed around the entire perimeter of the image capturing region, and may also be installed in just the direction of a portion of the image capturing region according to restrictions to their installation locations and the like.

The number of cameras is not limited, and for example, in the case in which the image capturing region is made a rugby field, around several dozen to several hundred cameras may be installed around the field.

In addition, the plurality of cameras may also include cameras with different angles of view such as telephoto cameras or wide-angle cameras. For example, it is possible to improve the resolution of the generated virtual viewpoint image by using a telephoto camera to capture high resolution images of the players. Alternatively, in the case of ball games, the movement range for the ball is wide, and therefore it is possible to reduce the number of cameras by capturing the images using a wide-angle camera.

In addition, the degree of freedom for the installation positions is improved by capturing images by combining the image capturing regions for a wide-angle camera and a telephoto camera. Note that the cameras are synchronized to a common time, and image capturing time information is assigned to the images for each frame in the captured images.

The virtual viewpoint image is also called a free viewpoint image, and a user can monitor the image corresponding to a freely (arbitrarily) designated viewpoint. However, for example, an article in which the user monitors an image corresponding to a designated viewpoint from a limited plurality of viewpoint options is also included in the virtual viewpoint image.

In addition, the designation for the virtual viewpoint may be performed by a user operation, or it may also be performed automatically by an AI based on the results of image analysis or the like. In addition, the virtual viewpoint image may be a video, or it may also be a stationary image.

The virtual viewpoint information that is used in the generation of the virtual viewpoint image is information that includes the position, direction (posture) and furthermore angle of view (focal distance), and the like of the virtual viewpoint. Specifically, the virtual viewpoint information includes parameters that show the three-dimensional position of the virtual viewpoint, parameters that show the directions (the direction of the line of sight) from the virtual viewpoint in the pan, tilt, and roll directions, focal distance information, and the like. However, the contents of the virtual viewpoint information are not limited to the above description.

In addition, the virtual viewpoint information may also have parameters for each of a plurality of frames. That is, the virtual viewpoint information may have parameters that correspond to each of a plurality of frames that configure the video for the virtual viewpoint image, and it may be information that shows the position and orientation of the virtual viewpoint at each of a continuous plurality of points in time.

The virtual viewpoint image is generated by, for example, the following method. First, images from a plurality of cameras are obtained by capturing images from different directions using cameras. Then, a foreground image in which a foreground region corresponding to a subject such as a person, a ball, or the like has been extracted, and a background image in which the background regions other than the foreground region have been extracted are obtained from the plurality of camera images. The foreground image and the background image have texture information (color information and the like).

In addition, a foreground model that shows the three-dimensional form of the subject, and texture data for coloring the foreground model are generated based on the foreground image. In addition, texture data for coloring a background model that shows the three-dimensional form of background such as a stadium or the like is generated based on the background image.

In addition, mapping is performed for the texture data for the foreground model and the background molded, and a virtual viewpoint image is generated by performing rendering according to the virtual viewpoint that shows the virtual viewpoint information.

However, the generating method for the virtual viewpoint image is not limited thereto, and various methods such as methods that generate virtual viewpoint images by projection transformations of the captured image without using foreground and background models, and the like, can be used.

The foreground image is an image in which the region of the subject (foreground region) has been extracted from a captured image that has been obtained by image capturing using a camera. The subject that is extracted to serve as the foreground region indicates a moving subject (a moving body) which has movements in the case in which image capturing has been performed in a time series in the same direction (the absolute position and form thereof can be changed), or the like.

The subject includes, for example, during a sporting match, people such as the players, referees, and the like inside of the field where this is taking place, and if this is a ball sport, the ball or the like in addition to the people. In addition, during a concert or a form of entertainment, the singer, player, performer, host, or the like is the foreground subject.

The background image is an image of a region (the background region) that is at least different from the subject that is the foreground. Specifically, the background image is an image of a state in which the subject, which becomes the foreground, has been removed from the captured image. In addition, the background indicates an image capturing subject that is stationary or for which a near-stationary state continues in the case in which image capturing has been performed from the same direction in a time series.

Such an image capturing subject is, for example, a stage for a concert or the like, a stadium in which a sporting event or the like is performed, a structure that is used in a ball sport such as a goal or the like, a field, or the like. However, the background is at least a region that is different from the subject that is the foreground. Note that other objects and the like may also be included as the image capturing subject, other than the subject and the background.

FIG. 1 is a diagram showing an image processing system 100 according to a First Embodiment. Note that a portion of the functional blocks that are shown in FIG. 1 are realized by a computer that is included in the image processing system 100 executing a computer program that has been stored on a memory serving as a storage medium.

However, the image processing system 100 may also be configured such that this portion or the entirety thereof is realized by hardware. To serve as the hardware, a dedicated circuit (ASIC) and a processor (a reconfigurable processor, a DSP), or the like can be used).

In addition, each of the functional blocks of the image processing system 100 do not need to be built into the same housing, and they may also be configured by separate devices that have been connected to each other via a signal path. The image processing system 100 is connected to a plurality of cameras. In addition, the image processing system 100 has a form estimating unit 2, an image generating unit 3, a content generating unit 4, a storage unit 5, a display unit 115, an operating unit 116, and the like.

The form estimating unit 2 is connected to the plurality of cameras 1 and the image generating unit 3, and the display unit 115 is connected to the image generating unit 3. Note that each functional block may be installed on a separate device, or the entirety thereof or several of the functional blocks may also be installed on the same device.

The plurality of cameras 1 are installed in different positions around a stage for a concert or the like, a stadium where an event such as a sporting match or the like is performed, a structure such as a goal that is used in a ball sport or the like, a field, or the like, and each of these perform image capturing from a different viewpoint. In addition, each camera has an identification number for identifying that camera (a camera number).

The cameras 1 may also include functions for extracting a foreground image from a captured image, other functions, or hardware for realizing these functions (circuits, devices, and the like). The camera numbers may be set based on the installation positions of the cameras 1, or they may also be set using other criteria.

The image processing system 100 may also be installed inside the venue in which the cameras 1 are installed, or it may also be installed outside of the venue, for example at a broadcasting station or the like. The image processing system 100 is connected to the cameras 1 via a network.

The form estimating unit 2 acquires images from the plurality of cameras 1. Then, the form estimating unit 2 estimates a three-dimensional form for the subject based on the images that have been acquired from the plurality of cameras 1.

Specifically, the form estimating unit 2 generates three-dimensional data that is displayed using a well-known representation method. The three-dimensional data may be point group data that is configured by points, mesh data that is configured by polygons, or voxel data that is configured by voxels.

The image generating unit 3 acquires information that shows the position and posture of the three-dimensional form data for the subject from the form estimating unit 2, and is able to generate a virtual viewpoint image including a two-dimensional form of the subject that is represented in the case in which the three-dimensional form of the subject is seen from the virtual viewpoint.

In addition, in order to generate the virtual viewpoint image, the image generating unit 3 receives the selection of the virtual viewpoint information (the position of the virtual viewpoint, the direction of the line of sight from the virtual viewpoint, and the like) from a user, and is able to generate a virtual viewpoint image based on this virtual viewpoint information. In this context, the image generating unit 3 functions as an acquisition unit that generates virtual viewpoint images based on a plurality of images that have been obtained from the plurality of cameras.

The virtual viewpoint image is sent to the content generating unit 4, and as will be described below, in the content generating unit 4, for example, stereoscopic form digital contents are generated. In addition, the digital contents that include the virtual viewpoint image that have been generated by the content generating unit 4 are output to the display unit 115.

Note that the content generating unit 4 can directly receive images from a plurality of cameras, and supply images for each camera to the display unit 115. In addition, the content generating unit 4 can also switch which plane of the virtual stereoscopic image on which to display the images from each camera and the virtual viewpoint image based on commands from the operating unit 116.

The display unit 115 is configured by, for example, a liquid crystal display, an LED, or the like, and acquires and displays digital content including virtual viewpoint images from the content generating unit 4. In addition, it also displays a GUI (Graphical User Interface) or the like for the user to operate each of the cameras 1.

In addition, the operating unit 116 is configured by a joystick, a jog dial, a touch panel, a keyboard, a mouse, or the like, and is used in order for the user to perform the operations of the cameras 1, and the like.

In addition, the operating unit 116 is used in order for the user to select the image to be displayed on the surface of the digital contents (stereoscopic image) that are generated by the content generating unit 4. Furthermore, the operating unit 116 can also designate the position and posture of the virtual viewpoint in order to generate the virtual viewpoint image in the image generating unit 3, and the like.

Note that the position and the posture of the virtual viewpoint may also be directly designated on the image by a user operation command. Alternatively, in the case in which a predetermined subject has been designated in the image by a user operation command, the processing may also be made such that this predetermined subject is image recognized and tracked, and the virtual viewpoint information from this subject and the virtual viewpoint information from the position of an arc-shaped circumference that is centered on this subject are automatically designated.

Furthermore, the processing may also be made such that subjects that fulfill conditions that have been set by a user operation command in advanced are image recognized, and the virtual viewpoint information from this subject and the virtual viewpoint information from the position of an arc-shaped circumference that is centered on this subject are automatically designated. In this case, the conditions that are designated include, conditions such as, for example, a specific athlete's name, a person who has taken a shot, a person who has made a good play, the position of the ball, or the like.

The storage unit 5 includes a memory for storing digital contents that have been generated by the content generating unit 4, virtual viewpoint images, camera images, and the like. In addition, the storage unit 5 may also have a removable storage medium.

The removable storage medium may also store a plurality of camera images that have been captured at for example, another venue, or a different sports scene, virtual viewpoint images that have been generated using these, digital content that has been generated by combining these, or the like.

In addition, the storage unit 5 may also be made so as to be able to store a plurality of camera images that have been downloaded from an external server or the like via a network, virtual viewpoint images that have been generated using these, digital contents that have been generated by combining these, or the like. In addition, these camera images, virtual viewpoint images, digital contents or the like may also have been created by a third party.

Figure 2:
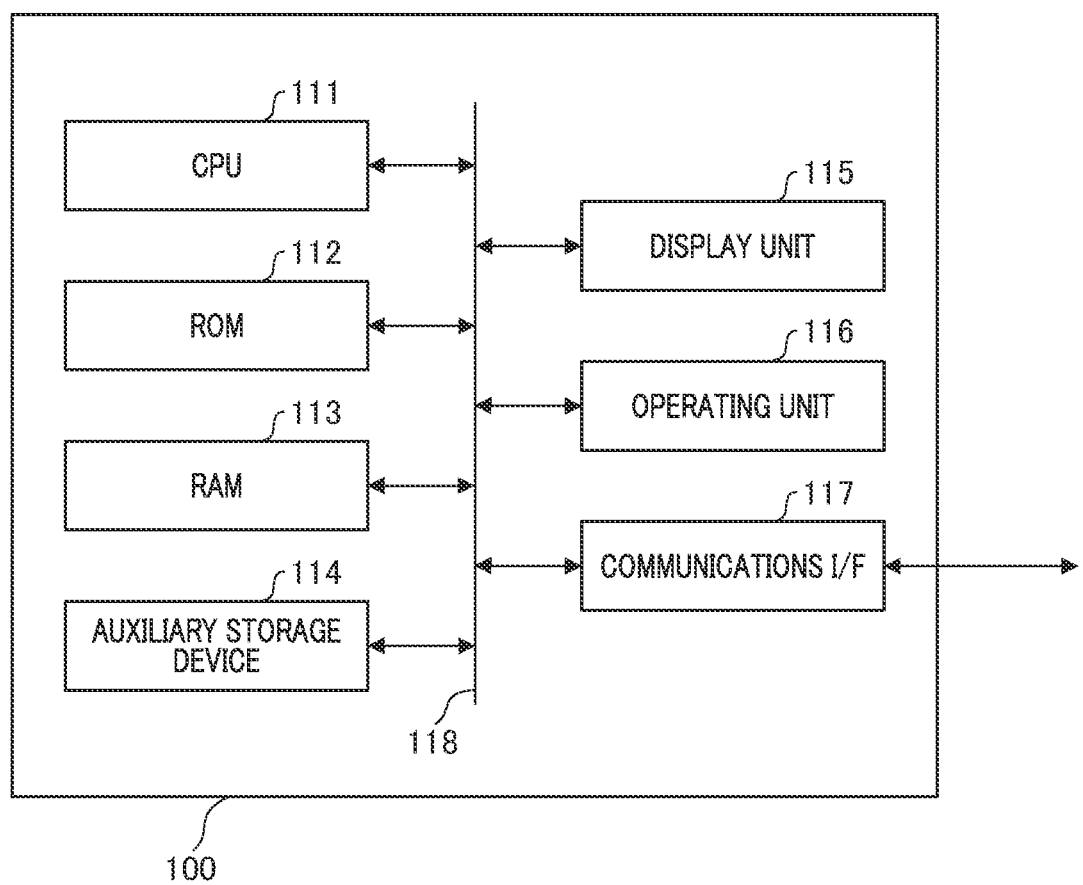
FIG. 2 is a diagram showing a hardware configuration of the image processing system 100 according to the First Embodiment.

FIG. 2 is a diagram showing the hardware configuration of the image processing system 100 according to the First Embodiment, and the hardware configuration for the image processing system 100 will be explained by using FIG. 2.

The image processing system 100 has a CPU 111, a ROM 112, a RAM 113, an auxiliary storage device 114, a display unit 115, an operating unit 116, a communications I/F 117, a bus 118, and the like.

The CPU 111 realizes each functional block of the image processing system shown in FIG. 1 by controlling the entirety of the image processing system 100 by using a computer program or the like that is stored on the ROM 112, the RAM 113, the auxiliary storage device 114, or the like.

The RAM 113 temporarily stores computer programs and data that are provided from the auxiliary storage device 114, or data or the like that is provided externally via the communications I/F 117. The auxiliary storage device 114 is configured by, for example, a hard disk drive or the like, and records various types of data such as digital contents including image data, audio recording data, and virtual viewpoint images from the content generating unit 4.

The display unit 115 displays, as has been described, digital content including virtual viewpoint images, GUIs, and the like. The operating unit 116 inputs each type of command to the CPU 111 by receiving operation input from users, as has been described. The CPU 111 operates as a display control unit that controls the display unit 115, and an operations control unit that controls the operating unit 116.

The communications I/F 117 is used in communications with devices that are external to the image processing system 100 (for example, the cameras 1, an external server, and the like). For example, in the case in which the image processing system 100 is connected by a wire to an external device, a communications cable is connected to the communications I/F 117.

In the case in which the image processing system 100 has a function that wirelessly communicates with external devices, the communications I/F 117 is provided with an antenna. The bus 118 transmits information by connecting each unit of the image processing system 100.

Note that in the First Embodiment, an example is shown in which the display unit 115 and the operating unit 116 are included inside of the image processing system 100. However, at least one of the display unit 115 and the operating unit 116 may also exist as a separate device that is external to the image processing system 100. Note that the image processing system 100 may also take a form such as, for example, a PC terminal.

FIG. 3 is a flowchart for explaining the operational flow of the image processing system 100 in the First Embodiment. In addition, FIGS. 4A to 4C are diagrams showing examples of stereoscopic-form digital contents that are generated by the content generating unit 4 in the First Embodiment.

Note that the operations for each step in the flowchart in FIG. 3 are performed by for example, the CPU 111 that serves as the computer of the image processing system 100 executing a computer program that has been stored on a memory such as the ROM 112, the auxiliary storage device 114, or the like.

Figure 4A:
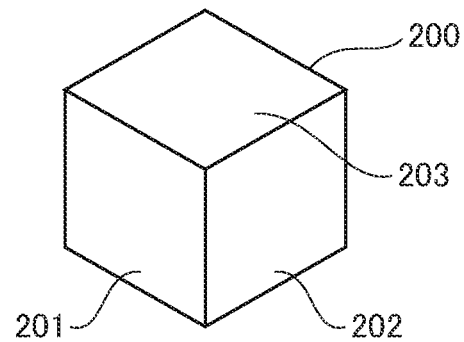
FIGS. 4A to 4C are diagrams showing examples of stereoscopic images that serve as contents generated by a content generating unit 4 in the First Embodiment.
Figure 4B:
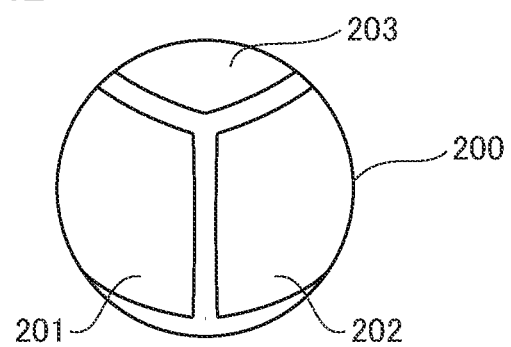
Figure 4C:
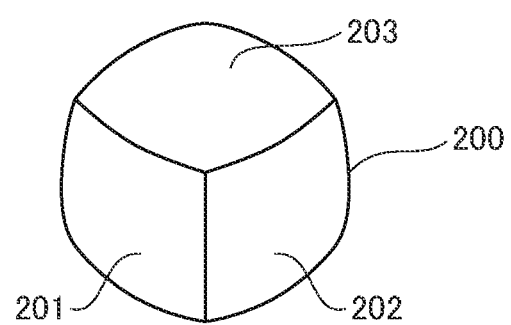

Note that in the First Embodiment, the image processing system 100 may be installed in a broadcasting station or the like, and may produce and broadcast stereoscopic form digital contents 200 as is shown in FIG. 4A, or it may also provide these contents via the internet. In this case, the digital contents 200 are made to enable applying NFTs.

That is, in order to improve the value of its assets, the processing is made such that, for example, the contents to be distributed can be made so as to have rarity by limiting the amount thereof and managing this using a serial number, or the like. Note that NFT is an abbreviation of Non-Fungible Token, and is a token for issue and circulation on a block chain.

As one example of the format of the NFT, there are the token standards called ERC-721 and ERC-1155. The token is usually stored by being associated with a wallet that is managed by a user.

In Step S31, the CPU 111 associates a main camera image (a first image) with a first plane 201 of the stereoscopic form digital contents 200 as in, for example, FIG. 4A. Note that the main camera image that has been associated with the first plane 201 may also be displayed for confirmation by a user.

Furthermore, as is shown in FIG. 4A, in the case in which the line-of-sight direction from the viewpoint at which the digital contents are virtually viewed (specifically, the vertical direction of the paper in FIG. 4A), and the normal direction of the first plane 201 are not parallel, the display described below may be performed.

That is, the main camera image that is displayed on the first plane 201 may also be generated by being projection converted according to the angle of the normal direction of the first plane 201 in relation to the display plane for the digital content. In this context, the main camera image (main image, first image) is an image that has been selected for TV broadcasting or the like from among a plurality of images that have been obtained from a plurality of cameras that have been installed in a sports stadium.

Note that the main image is an image that includes a predetermined subject in the angle of view. In addition, the main camera image does not need to have been captured by a camera that has been installed in a sports stadium.

For example, it may also be an image that has been captured by a camera brought into the venue and held by a camera person. Alternatively, it may also be an image that has been captured by a camera or an electronic device such as smart phone with a built-in camera or the like that has been brought into the venue by a viewer. In addition, the main camera image may also be from one camera from among a plurality of cameras that are used to generate the virtual viewpoint images, or it may also be from a camera that is not included in this plurality of cameras.

From which camera an image will be broadcasted or streamed online as the main image is successively selected by a user such as a broadcasting station or the like by using the operating unit 116. For example, in the case in which the moment that a goal is scored is broadcasted or streamed, there are many cases in which images from cameras in the vicinity of the goal are broadcasted as the main image.

Note that in the First Embodiment, as is shown in FIGS. 4A to 4C, the plane that is seen on the left side from straight on is made the first plane, the plane that is seen as the right side is made the second plane, and the plane that is seen as the top is made the third plane. However, the invention is not limited thereto. It is made such that which planes to make the first plane to the third plane can be arbitrarily set in advance.

In step S32, the content generating unit 4 associates data such as, for example, the name of a player who shot a goal, the name of the team that this player belongs to, and the final results of the match in which they made the goal to serve as the attached data for the third plane 203 of the digital content 200. Note that the attached data that has been associated with the third plane 203 may also be displayed for confirmation by a user.

In the case in which NFTs are applied, data showing the rarity thereof such as the number issued or the like may also be displayed on the third plane 203 as the attached data. The number issued may be determined by the user who generates the digital content by using an image generation system, or it may also be determined automatically by the image generation system.

In step S33, the image generating unit 3 acquires images in which the orientation of the point of view differs by a predetermined angle in relation to the orientation of the point of view for the camera that captures the main camera image, for example, those including the goal or a shooter, from among the images from the plurality of cameras 1. The above predetermined angle is, for example, 90 degrees.

In this case, the instillation positions, postures, and the like of the plurality of cameras are known in advance, and therefore, the CPU 111 is able to determine from which camera an image for which the orientation of the viewpoint differs by a predetermined angle, as was described above, in relation to the main camera, can be obtained. Note that although below there are cases in which the phrase the "viewpoint of the image" is used, this is either the viewpoint of the camera that captures this image, or is the virtual viewpoint that has been designated in order to generate the image.

Alternatively, in step S33 (an acquisition step), a predetermined (as was described above, for example, in which the orientation in which the viewpoint differs by 90 degrees) virtual viewpoint in the image generating unit 3, and a virtual viewpoint image from a virtual viewpoint including a subject that has undergone image recognition may also be acquired.

In this case, the above-described predetermined (as was described above, for example, in which the orientation of the viewpoint, that is, the posture, differs by 90 degrees) virtual viewpoint may also be designated in relation to the image generating unit 3, and acquired by generating a virtual viewpoint image.

Alternatively, virtual viewpoint images with a plurality of viewpoints may already be generated in the image generating unit 3 in advance, and may be acquired by selecting the corresponding image from among these. Note that in the First Embodiment, the image with a viewpoint that differs by a predetermined angle in relation to the main camera image is made, for example, an image with a viewpoint that is different by 90 degrees. However, it is made such that this angle can be set in advance.

In addition, the virtual viewpoint image may also be an image corresponding to a virtual viewpoint that is specified based on the orientation of the subject (for example, if this a person, the orientation of their face and body) that is included in the main camera image. Note that in the case in which there are a plurality of subjects that are included in the main camera image, the virtual viewpoint may be set in relation to one subject from among these, or the virtual viewpoint may be set in relation to a plurality of subjects.

Note that above, an example has been explained in which a viewpoint with a predetermined angle in relation to the main image is selected. However, it may also be made such that a virtual viewpoint image from one predetermined viewpoint from any one of, for example, the subject viewpoint, the viewpoint from behind the subject, a virtual viewpoint from among the positions on an arc with the subject as the center, or the like, is selected and acquired.

The subject viewpoint is a virtual viewpoint in which the position of the subject is made the position of the virtual viewpoint, and the orientation of the subject is made the line-of-sight direction from the virtual viewpoint. For example, in the case in which a human is made the subject, the subject viewpoint is a viewpoint in which the position of the person's face is made the position of the virtual viewpoint, and the orientation of the person's face is made the line-of-sight direction from the virtual viewpoint. Alternatively, the line-of-sight direction of this person may also be made the line-of-sight direction from the virtual viewpoint.

The viewpoint from behind the subject is a virtual viewpoint in which a position that is separated from the rear of the subject by a predetermined distance is made the position of the virtual viewpoint, and the direction facing the position of the subject from that position is made the line-of-sight direction from the virtual viewpoint. In addition, the line-of-sight direction from the virtual viewpoint may also be determined according to the orientation of the subject.

For example, in the case in which the subject is a person, the viewpoint from behind the subject is a virtual viewpoint in which a position that is separated from the person's back by a specific distance is made the position of the virtual viewpoint, and the orientation of the person's face is made the line-of-sight direction from the virtual viewpoint.

A virtual viewpoint from among the positions on an arc centered on the subject is a virtual viewpoint in which a position on a sphere defined by a predetermined radius that is centered on the position of the subject is made the position of the virtual viewpoint, and the direction facing the position of the subject from this position is made the line-of-sight direction from the virtual viewpoint.

For example, in the case in which the subject is a person, a position on a sphere defined by a predetermined radius that is centered on the position of the person is made the position of the virtual viewpoint, and the direction facing the position of the subject from this position is made the line-of-sight direction from the virtual viewpoint.

In this manner, step S33 functions as a virtual viewpoint image generating step that makes a second image by acquiring a virtual viewpoint image from a viewpoint having a predetermined relationship with the first image. Note that in this context, the virtual viewpoint image from a viewpoint having a predetermined relationship with the first image is made a virtual viewpoint image from the same time (image capturing timing) as the viewpoint for the first image.

In addition, in the First Embodiment, the viewpoint having a predetermined relationship with the first image is made a viewpoint that is in a predetermined angular relationship or a predetermined positional relationship with the viewpoint of the first image, as has been described above.

Next, in step S34, the CPU 111 associates this second image with the second plane 202 of the digital content 200. Note that the second image may also be displayed for confirmation by a user. Note that at this time, the main image that is associated with the first plane 201 and the second image that is associated with the second plane 202 are synchronization controlled so as to become images that were captured at the same time, as was explained above.

In this manner, steps S31 to S34 associate the first image with the first plane, which will be described below, of the stereoscopic form digital content, and associate a virtual viewpoint image of a virtual viewpoint having a predetermined relationship with the first image with the second plane 202. In addition, steps S31 to S34 function as a content generating step (a content generating unit).

Next, in step S35, the CPU 111 determines if an operation to change the viewpoint for the above-described second image that is displayed on the second plane 202 has been performed via the operating unit 116. That is, there are cases in which the user changes the viewpoint of the second image to be displayed on the second plane by, for example, selecting a camera image with a desired viewpoint from among the plurality of cameras 1 while watching a sporting scene, which changes by the minute.

Alternatively, there are also cases in which, by selecting a desired viewpoint from among the virtual viewpoints for the image generating unit 3, a virtual viewpoint image from this viewpoint is acquired. In step S35, in the case in which such a viewpoint changing operation has been performed, this becomes Yes, and the process proceeds to step S36.

In step S36, the CPU 111 selects a viewpoint image after the viewpoint has been changed from among the plurality of cameras 1, or alternatively, a virtual viewpoint image after the viewpoint has been changed is acquired from the image generating unit 3.

The acquisition of the virtual viewpoint image may by the acquisition of a virtual viewpoint image that has already been generated, or it may also be acquisition by generating a new virtual viewpoint image based on the changed viewpoint. In addition, this acquired image is made the second image, and the process transitions to step S34, and associates this with the second plane.

In this state, the display unit 115 associates each of the first through third planes of the digital content 200 with the first image, the second image, and the attached data. In this context, the user may also confirm the state in which the first image, the second image, and the attached data have been associated with each of the first through third planes of the digital content 200 using a display. Note that in this case, the number of the plane may also be displayed so that the user understands which planes are the first through third planes.

In the case in which there are no changes to the viewpoint in step S35, the processing proceeds to step S37, and the CPU 111 determines whether or not an NFT will be applied to the digital contents 200. In order to do so, for example, a GUI that queries whether or not to apply an NFT to the digital contents 200 is displayed on the display unit 115.

In addition, in the case in which the user has selected to apply an NFT, this is determined, and the process proceeds to step S38, an NFT is applied to the digital contents 200, and the process proceeds to step S39 after encryption.

In the case in which No has been determined in step S37, the process proceeds to step S39 as is. Note that the digital contents 200 in step S37 may also be stereoscopic images in a form such as those in FIG. 4B, and FIG. 4C. In addition, in the case that this is polyhedral, it is not limited to having 6 planes as in FIG. 4A, but may also have, for example, eight planes or the like.

In step S39, the CPU 111 determines whether or not to finish the flow in FIG. 3 for generating the digital contents 200. In addition, if the user does not finish the flow by operating the operating unit 116, the process will return to step S31, and the above described processing will be repeated, or if it is finished, the flow in FIG. 3 will be completed.

Note that even if the process is not finished by a user operating the operating unit 116, it may also be automatically finished after a predetermined time period (for example, 30 minutes) has passed since the last operation of the operating unit 116.

Note that FIG. 4B, and FIG. 4C are figures showing examples of variations of the digital contents 200, and have made the digital contents 200 from FIG. 4A and FIG. 4B round. For example, the first image is displayed on the first plane 201, which is a round plane on the left as seen from straight on of the round-form digital contents 200, and the second image is displayed on a second plane 202, which is the round plane on the right side. In addition, the attached data as was described above is displayed on a third plane 203, which is the upper side of the round plane.

FIG. 4C is a diagram showing an example in which each plane of the digital content 200 in FIG. 4A has been made a curved plane with a predetermined curvature. In this manner, the display of the digital content in the First Embodiment may also be the display of an image using a sphere, or a cube in which the surface is a spherical plane as in FIG. 4B, and FIG. 4C.

Second Embodiment

Figure 5:
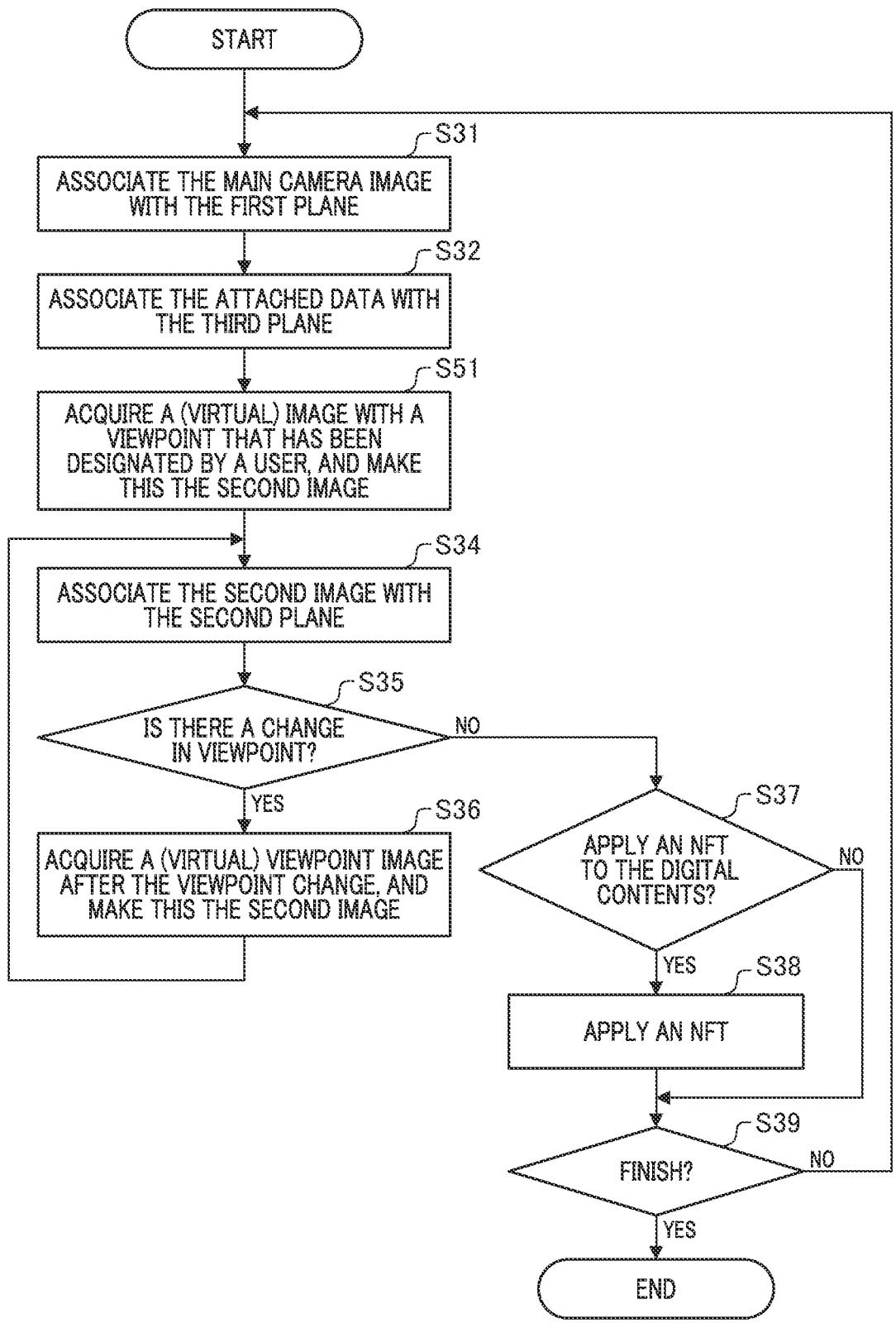
FIG. 5 is a flow chart for explaining the operational flow of the image processing system 100 according to a Second Embodiment.

Next, the Second Embodiment will be explained using FIG. 5. FIG. 5 is a flowchart for explaining the operational flow of the image processing system 100 in the Second Embodiment. Note that each step in the operations in the flowchart in FIG. 5 are performed by the CPU 111 that serves as the computer of the image processing system 100 executing a computer program that has been stored on a memory such as, for example, the ROM 112, the auxiliary storage device 114, or the like.

Note that the steps in FIG. 5 that have the same reference numerals as those in FIG. 3 are the same processes, and explanations thereof will be omitted. In step S51 of FIG. 5, the CPU 111 acquires, from the image generating unit 3, a camera image from a viewpoint that has been designated by the user, or a virtual viewpoint image from a virtual viewpoint that has been designated by the user. Next, the acquired image is made the second image. All other processing is the same as the flow in FIG. 3.

In the First Embodiment, the processing was made such that a second image having a predetermined relationship (differing by a predetermined angle) in relation to the main image (first image) was acquired. However, in the Second Embodiment, the second image is determined by the user selecting a desired camera or acquiring a virtual viewpoint image from a desired viewpoint with respect to a desired subject.

Note that the camera image or virtual viewpoint image that is selected by the user in step S51 includes, for example, images from an obliquely upwards panoramic viewpoint in relation to the sporting venue or images from an obliquely downward viewpoint. In this manner, in the Second Embodiment, the user is able to select the virtual viewpoint image that will be displayed on the second plane.

In addition, the virtual viewpoint image that is selected by the user in step S51 may also be a virtual viewpoint image from a viewpoint from a position that is separated from the subject, for example, an image that has been zoomed out.

In addition, camera images that have been generated in the past, and virtual viewpoint images that have been generated based on these, or the like may be stored on the storage unit 5, and the processing may be made such that these are read out and are displayed on each of the first plane through the third plane as the first image, the second image, and the attached data.

Note that a step may also be inserted between step S38 and step S39 in which after a predetermined time period (for example, 30 minutes) has passed since the last operation of the operating unit 16, the display is automatically switched to the display of a default stereoscopic image by the CPU 111.

The default stereoscopic image display may display, for example, the main image on the first plane, for example, the attached data on the third plane, and display a camera image or a virtual viewpoint image from the viewpoint that statistically has the highest frequency in the past on the second plane.

Third Embodiment

Figure 6:
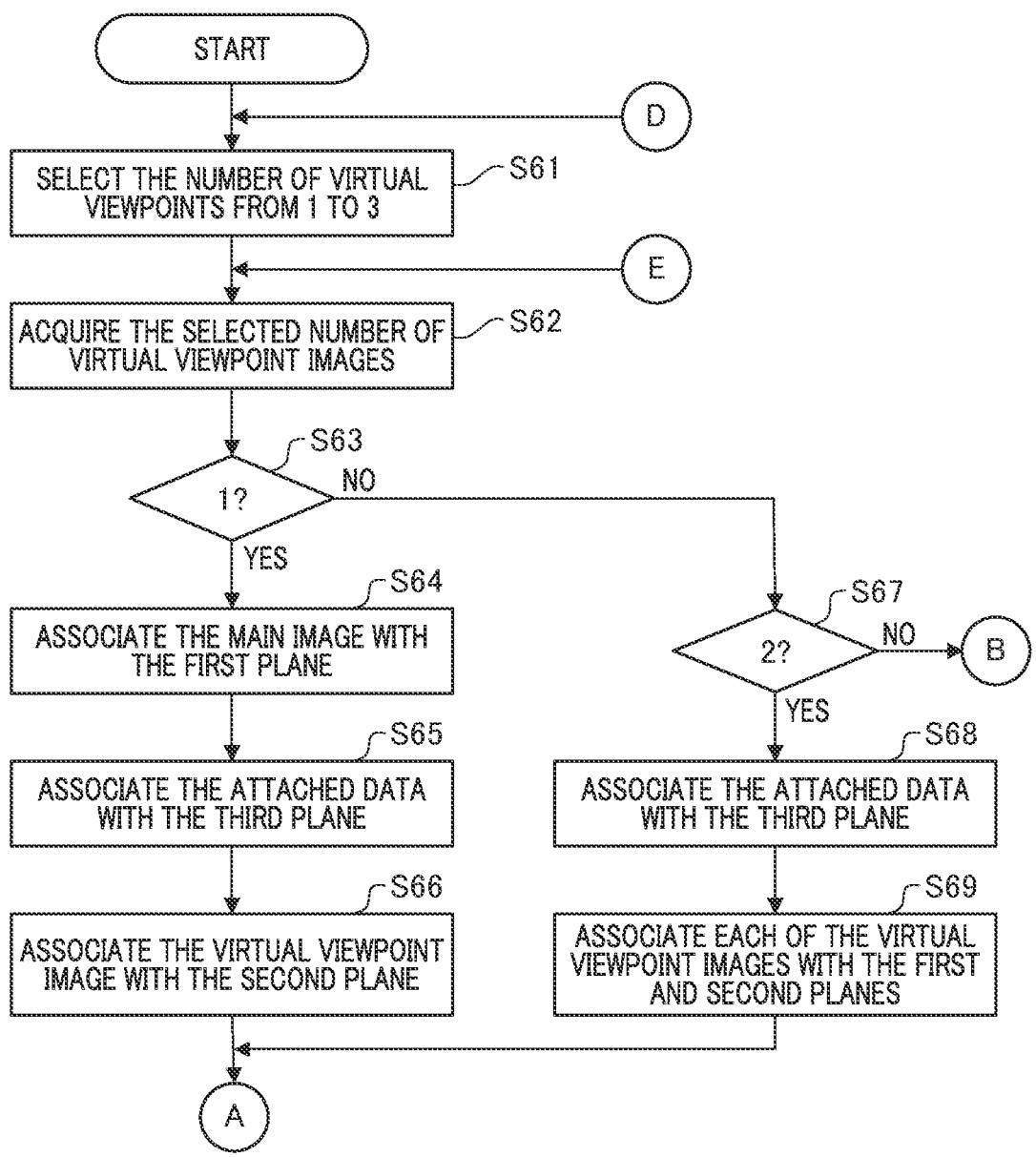
FIG. 6 is a flowchart for explaining the operational flow of the image processing system 100 according to a Third Embodiment.

The Third Embodiment will now be explained using FIG. 6 to FIG. 8. FIG. 6 is a flowchart for explaining the operational flow of the image processing system 100 in the Third Embodiment, FIG. 7 is a continuation of the flowchart in FIG. 6, and FIG. 8 is a continuation of the flowcharts in FIG. 6 and FIG. 7.

Figure 7:
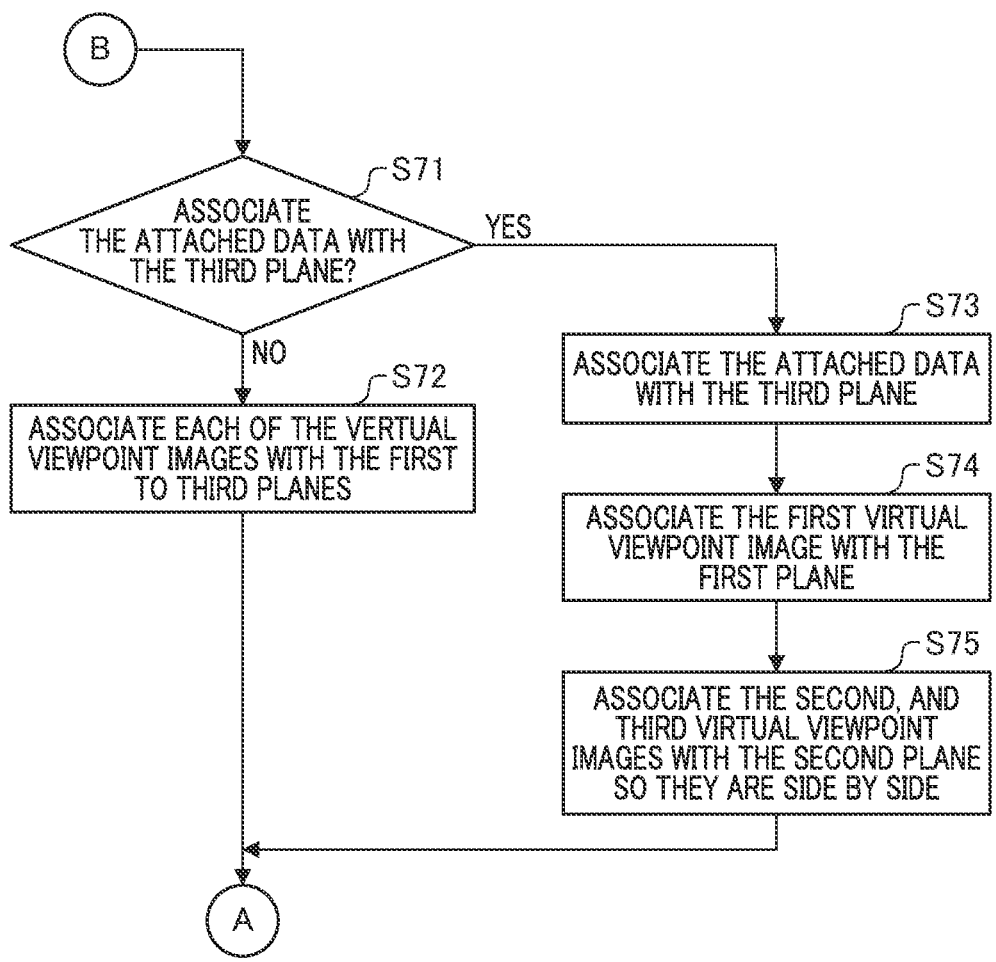
FIG. 7 is a continuation of the flowchart in FIG. 6.

Note that each step of the operations in the flowcharts in FIG. 6 to FIG. 8 are performed by the CPU 111 that serves as the computer of the image processing system 100 executing a computer program that has been stored on a memory such as, for example, the ROM 112, the auxiliary storage device 114, or the like.

In the Third Embodiment, upon the user selecting the number of virtual viewpoints from among 1 to 3, the display of the digital content 200 for the first to third planes is automatically switched depending on this.

In Step S61, the user selects the number of virtual viewpoints from between 1 to 3, and this is received by the CPU 111. In step S62, the CPU 111 acquires the selected number of virtual viewpoint images from the image generating unit 3.

At this time, the representative virtual viewpoint is automatically selected. That is, the scene is analyzed, and, for example, the virtual viewpoint that had the highest frequency of use based on past statistics in relation to this scene is made the first virtual viewpoint, the virtual viewpoint with the next highest frequency of use is made the second virtual viewpoint, and the virtual viewpoint with the next highest frequency of use after this is made the third virtual viewpoint.

Note that the processing may be set in advance such that, for example, the second virtual viewpoint differs from the first virtual viewpoint by for example, +90° and the third virtual viewpoint differs from the first virtual viewpoint by, for example, −90°. In this context, +90° and −90° are examples, and the invention is not limited to these angles.

In step S63, the CPU 111 determines whether or not the number of selected virtual viewpoints is one, and if it is one, the processing proceeds to step S64. In step S64, the CPU 111 acquires the main image from the main camera from among the plurality of cameras 1, and associates this with the first plane 201 of the digital contents 200.

Next, in step S65, the CPU 111 associates the attached data with the third plane 203 of the digital contents 200. The attached data may be, for example, the name of a player who has shot a goal, or the like, which is the same as the attached data that is displayed in step S32 of FIG. 3 in the First Embodiment.

In step S66, the CPU 111 associates the first virtual viewpoint image from the first virtual viewpoint that was described above with the second plane of the digital contents 200, and after this, the process proceeds to step S81 of FIG. 8.

In the case in which No has been determined in step S63, in step S67, the CPU 111 determines whether or not the selected number of virtual viewpoints is two, and if it is two, the process proceeds to step S68.

In step S68, the CPU 111 associates the attached data with the third plane 203 of the digital contents 200. The attached data may be, for example, the name of a player who shot a goal, or the like, which is the same as the attached data that is associated in step S65.

Next, in step S69, the CPU 111 associates the first virtual viewpoint image from the first virtual viewpoint with the first plane 201 of the digital contents 200. In addition, the second virtual viewpoint image from the second virtual viewpoint that has been described above is associated with the second plane 202 of the digital contents 200. After this, the process proceeds to step S81 in FIG. 8.

In the case in which No has been determined in step S67, the process proceeds to step S71 in FIG. 7. In step S71, the CPU 111 determines whether or not the user has made a selection that associates the attached data with the third plane 203. In the case of Yes, the process proceeds to step S72, and in the case of No, the process proceeds to step S73.

In step S72, the CPU 111 associates the virtual viewpoint image from the first virtual viewpoint with first plane 201 of the digital content 200, associates the virtual viewpoint image from the second virtual viewpoint with the second plane 202, and associates the virtual viewpoint image from the third virtual viewpoint with the third plane. After this, the process proceeds to step S81 in FIG. 8.

In the case in which S71 is No, in step S73, the CPU 111 associates the attached data with the third plane 203 of the digital contents 200. The attached data may be, for example, the name of a player who shot a goal, or the like, which is the same as the attached data that is associated in step S65.

Next in step S74, the CPU 111 associates the first virtual viewpoint image from the first virtual viewpoint with the first plane 201 of the digital content 200. In addition, in step S75, the CPU 111 associates the second virtual image from the second virtual viewpoint and the third virtual image from the third virtual viewpoint with the second plane 202 of the digital contents 200 so that they can be displayed side by side.

That is, the second plane 202 is separated into two regions to display the second virtual viewpoint image and the third virtual viewpoint image, and the virtual viewpoint images are associated with each region. After this, the process proceeds to step S81 in FIG. 8.

In step S81 in FIG. 8, the CPU 111 determines whether or not an NFT will be applied to the digital contents 200. For example, a GUI querying whether or not to apply an NFT to the digital contents 200 will be displayed on the display unit 115 for this purpose. In addition, in the case in which the user has selected to apply an NFT, the process proceeds to step S82, an NFT is applied to the digital contents 200, and the process proceeds to step S83 after encryption.

In the case in which No has been determined in step S81, the process proceeds to step S83 as is. Note that the digital contents 200 in step S81 may also be in a form such as that in FIG. 4B, and FIG. 4C, as was described above.

In step S83, the CPU 111 determines whether or not to finish the flow in FIG. 6 to FIG. 8, and if the user has not finished this by operating the operating unit 116, the process proceeds to step S84.

In step S84, the CPU 111 determines if the number of virtual viewpoints has not been changed. If the number has been changed, the process returns to step S61. If the number has not been changed, the process returns to step S62. In the case in which Yes is determined in step S83, the flow in FIG. 6 to FIG. 8 is finished.

Note that in the Third Embodiment, an example has been explained in which, upon the user selecting the number of virtual viewpoints from between one to three, the images that are associated with the first through third planes of the digital contents 200 are automatically switched according to this. However, it may also be made such that the user selects the number of camera images that are associated with the planes that configure the digital content 200 from among the images from a plurality of cameras.

In addition, it may also be made such that predetermined cameras are automatically selected from among the plurality of cameras 1 according to this, and these camera images are automatically associated with the first through third planes of the digital content 200.

Note that the maximum number of viewpoints does not need to be three. For example, the number of viewpoints may also be determined using a range that makes the maximum the number of planes that configure the digital content, or the number of planes with which it is possible to associate an image. In addition, if a plurality of images can be associated with one plane, it is possible to further increase the maximum number of viewpoints.

In addition, a step may also be inserted between step S82 and step S83 in which for example, the CPU 111 automatically switches the display to contents consisting of the display of a default stereoscopic image if a predetermined time period (for example, 30 minutes) has passed since the last operation of the operating unit 116.

In the default stereoscopic image display, for example, the main image is displayed on the first plane, and the camera image or virtual viewpoint image from the viewpoint that had the highest frequency of use based on the past statistics is displayed on the second plane. The third plane is made, for example, the attached data.

In the Third Embodiment, as was described above, in step S69, step S72, and step S95, it is made possible to associate a virtual viewpoint image that is different from the virtual viewpoint image displayed on the second plane with the first plane.

While the present disclosure has been described with reference to exemplary embodiments, it is to be understood that the disclosure is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the image processing system through a network or various storage media. Then, a computer (or a CPU, an MPU, or the like) of the image processing system may be configured to read and execute the program. In such a case, the program and the storage medium storing the program configure the present disclosure.

This application claims the benefit of Japanese Patent Application No. 2022-037555 filed on Mar. 10, 2022, which is hereby incorporated by reference herein in its entirety.

What is claimed is:

1. An image processing system comprising:
one or more memories storing instructions; and
one or more processors executing the instructions to:
acquire a virtual viewpoint image generated based on a virtual viewpoint and a plurality of images obtained by image capturing by a plurality of image capturing devices; and
generate stereoscopic form digital contents including the virtual viewpoint image and an image from a viewpoint that differs from the virtual viewpoint, the virtual viewpoint image associated with a first plane that configure the digital contents, and the image associated with a second plane that configure the digital contents, wherein the virtual viewpoint image associated with the first plane and the image associated with the second plane include a same subject and are displayed simultaneously.

2. The image processing system according to claim 1, wherein the image from a viewpoint that differs from the virtual viewpoint corresponding to the virtual viewpoint image is a captured image that has been obtained by image capturing using an image capturing device.

3. The image processing system according to claim 2, wherein the virtual viewpoint image that is included in the digital contents is an image having a predetermined relationship with the captured image.

4. The image processing system according to claim 3, wherein the image capturing timing for images that are used in the generation of the virtual viewpoint image that is included in the digital contents is same as the image capturing timing for the captured image.

5. The image capturing system according to claim 3, wherein the virtual viewpoint corresponding to the virtual viewpoint image that is included in the digital contents is in a predetermined angular relationship or a predetermined positional relationship with the viewpoint of the image capturing device that captures the captured image.

6. The image processing system according to claim 2, wherein the virtual viewpoint corresponding to the virtual viewpoint image that is included in the digital contents is determined based on a subject that is included in the captured image.

7. The image processing system according to claim 6, wherein the position of the virtual viewpoint is determined based on the position or the posture of a three-dimensional form depicting this subject.

8. The image capturing system according to claim 6, wherein the position of the virtual viewpoint is the position of the subject; and
the line-of-sight direction from the virtual viewpoint is determined based on the orientation of the subject.

9. The image processing system according to claim 8, wherein the subject is a person; and
the orientation of the subject is the orientation of the subject's face.

10. The image capturing system according to claim 6, wherein the position of the virtual viewpoint is a position that is separated from the rear of the subject by a predetermined distance, and
the line-of-sight direction from the virtual viewpoint is the direction facing the subject from the position that is separated from the rear of the subject by a predetermined distance.

11. The image processing system according to claim 6, wherein the position of the virtual viewpoint is a position on an arc of a circle centered on the position of the subject; and
the line-of-sight direction from the virtual viewpoint is the direction facing the subject from the position on the arc of the circle centered on the position of the subject.

12. The image processing system according to claim 1, wherein the image from the viewpoint that differs from the virtual viewpoint corresponding to the virtual viewpoint image is a virtual viewpoint image that is generated based on a virtual viewpoint that differs from this virtual viewpoint, and the plurality of images that have been obtained by image capturing using the plurality of image capturing devices.

13. The image processing system according to claim 1, wherein the plane with which the virtual viewpoint image is associated is also associated with another virtual viewpoint image.

14. The image capturing system according to claim 1, wherein the virtual viewpoint image and the image from the viewpoint differing from the virtual viewpoint corresponding to this virtual viewpoint image are associated with one of the planes that configure the digital contents.

15. The image processing system according to claim 1, wherein the digital contents is associated with an NFT (Non-Fungible Token).

16. An image processing method comprising:
an acquisition step that acquires a virtual viewpoint image that is generated based on a virtual viewpoint image and a plurality of images and a virtual viewpoint that have been obtained by image capturing by a plurality of image capturing devices; and
a generation step that generates stereoscopic form digital contents including the virtual viewpoint image and an image from a viewpoint that differs from the virtual viewpoint, the virtual viewpoint image associated with a first plane that configure the digital contents, and the image associated with a second plane that configure the digital contents, wherein the virtual viewpoint image associated with the first plane and the image associated with the second plane include a same subject and are displayed simultaneously.

17. A non-transitory computer-readable storage medium configured to store a computer program comprising instructions for executing following processes:

an acquisition step that acquires a virtual viewpoint image generated based on a virtual viewpoint image and a plurality of images and a virtual viewpoint obtained by image capturing using a plurality of image capturing devices; and a generation step that generates stereoscopic form digital contents including the virtual viewpoint image and an image from a viewpoint that differs from the virtual viewpoint, the virtual viewpoint image associated with a first plane that configure the digital contents, and the image associated with a second plane that configure the digital contents, wherein the virtual viewpoint image associated with the first plane and the image associated with the second plane include a same subject and are displayed simultaneously.

* * * * *